United States Patent [19]

Tanoshima et al.

[11] Patent Number: 5,195,074
[45] Date of Patent: Mar. 16, 1993

[54] ROTATABLE READ/WRITE OPTICAL HEAD APPARATUS

[75] Inventors: Katsushide Tanoshima; Minoru Ohtsuka; Shizuo Nagata; Masahiro Takahashi; Yasuo Shimizu, all of Tokyo, Japan

[73] Assignee: Oki Electric Industry Co., Ltd., Tokyo, Japan

[21] Appl. No.: 740,379

[22] Filed: Aug. 5, 1991

Related U.S. Application Data

[63] Continuation-in-part of Ser. No. 373,816, Jun. 30, 1989, abandoned.

[30] Foreign Application Priority Data

Jul. 7, 1988 [JP] Japan ................................. 63-169400

[51] Int. Cl.[5] ...................... G11B 7/085; G11B 21/00
[52] U.S. Cl. .................................. 369/48; 369/44.11; 369/44.14; 369/44.17; 369/44.21
[58] Field of Search ............... 369/44.11, 44.12, 44.14, 369/44.17, 44.19, 44.21, 44.22, 48

[56] References Cited

U.S. PATENT DOCUMENTS 4,942,562  7/1990  Suzuki ............................. 369/44.11

FOREIGN PATENT DOCUMENTS 2128031  6/1987  Japan ................................. 369/44.11

Primary Examiner—Tommy P. Chin
Assistant Examiner—Khoi Truong
Attorney, Agent, or Firm—Spencer, Frank & Schneider

[57] ABSTRACT

In an optical head apparatus for recording or reproducing information onto or from an optical disc, a carriage is movable along a guide shaft extending in a direction parallel with the radial direction of the optical disc, and an armature is mounted on the carriage so that it can rotate about a pivotal axis perpendicular to the surface of the optical disc. An objective lens is fixed to the armature and positioned to traverse the tracks on the optical disc when the armature rotates. Guide yokes extend in parallel with the guide shaft. Tracking and carriage-servo coils are fixed to the armature and have a hollow through which the guide yokes loosely extend. A magnetic field means creates magnetic lines of force perpendicular to the longitudinal direction of the guide yokes and parallel with the surface of the optical disc. A drive circuit supplies currents to the tracking and carriage-servo coils in such directions as to produce electromagnetic forces in parallel with each other thereby driving the armature along the guide yokes or in such directions as to produce electromagnetic forces in antiparallel with each other to rotate the armature about the pivotal axis.

14 Claims, 9 Drawing Sheets

32 OPTICAL SYSTEM

ROTATABLE READ/WRITE OPTICAL HEAD APPARATUS

This application is a continuation-in-part of U.S. application Ser. No. 07/373,816 filed Jun. 30, 1989 non abandoned.

BACKGROUND OF THE INVENTION

The present invention relates to an optical head apparatus suitable for use in an optical disc unit.

In an optical data recording/reproducing apparatus, in which a predetermined recording medium (optical disc) is irradiated with a light beam to record or reproduce data, it is necessary to focus the light on the disc, for a light spot to trace a track on the disc and to move the light spot toward the inner and outer circumferences. Therefore, the optical head apparatus is arranged so that it can achieve such focus control, tracking control and (radial) carriage control.

FIG. 2 illustrates the construction of a conventional optical head apparatus, which is applied to the compact disc player or optical video disc player or the like. As illustrated, an objective lens 2 is mounted on the upper surface of a substantially cylindrical armature 1. A post 3 is fixed upright on a carriage 11 to support the armature 1 so that the latter may vertically move or slide, and rotate. A focusing coil 4 is wound about the outer peripheral wall of the armature 1, and tracking coils 5 are stuck onto the focusing coil 4. Yokes 7 are fixed to the carriage 11 and permanent magnets 6 are attached thereto. Additional yokes 8 are fixed to the carriage 11. The yokes 8 and magnets 6 are respectively disposed inside and outside of the armature in such a way that they may oppose each other with the coils 4 and 5 interposed therebetween. An optical system 9 emits a laser beam 10 and is mounted on the carriage 11. Slide portions 12 are formed at the end portions of the carriage 11 and guide shafts 13 are inserted therethrough. An access (carriage) motor 14 rotates a screw 15. The screw 15 engages with a receiver portion 17 fixed to the carriage 11. A mirror 16 is fixed to the carriage 11.

The laser beam 10 emitted from a light source (not shown) such as a semiconductor laser or the like, which is incorporated into the optical system 9, is reflected by the mirror 16 to be directed into the objective lens 2, which in turn converges the incident light for irradiation onto a disc (not shown). The light reflected by the disc returns along the same path to be directed to the optical system 9. The optical system 9 incorporates photodiodes (not shown) to detect the light reflected from the disc.

A focus error signal is generated from the outputs of the photodiodes and is supplied to the coil 4. Since the coil 4 is disposed within the magnetic field of the magnets 6, when a current corresponding to the focus error signal flows, an electromagnetic force will be generated. As a result, guided by the post 3, the armature 1 (hence the objective lens 2) moves in the vertical direction (i.e., focusing direction). In this way, the focusing control is achieved.

Meanwhile, the tracking error signal generated from the outputs of the photodiodes is supplied to the coils 5. Since the coils 5 are also disposed within the magnetic field of the magnets 6, when the current flows, an electromagnetic force is generated. This electromagnetic force causes the armature 1 to be rotated in the clockwise or counterclockwise direction, with the post as a fulcrum. As a result, the tracking control is achieved.

Furthermore, when the data recording/reproducing position is moved in the direction of its inner or outer circumference, a carriage (radial) error signal is input to the access motor 14. At this time, the screw 15 is rotated by the motor 14. Since the receiver portion 17 engages the screw 15, guided by the shaft 13, the carriage 11 is moved radially of the disc with the result that carriage (radial) control is achieved.

As seen above, the optical head unit of FIG. 2, in which not only the optical system 9 but also the magnetic circuit and the like are loaded on the carriage 11, weighs as much as 50 g, and the average access speed with respect to a predetermined track is on the order of 300 ms, which is slow.

FIG. 3 shows another conventional optical head unit, in which the above-mentioned drawbacks are eliminated. As illustrated, a carriage 21 has slide portions 22 on its opposite end portions, and is supported by a pair of guide shafts 23 extending in the direction of the optical disc, so that the carriage can move along the guide shafts 23.

An armature 24 is mounted to the carriage 21, and an objective lens 25 is attached to the armature 24. A slide shaft 27 is fixed to the carriage 21 and is inserted through a slide portion 26 fixed to the armature 24. Coils 28 are for tracking and radial servo control of the carriage. Focusing coils 29 are stuck on the coils 28.

Yokes 31 are inserted through the respective coils 28, and permanent magnets 30 are disposed to generate magnetic fields extending to the yokes 31. Closed magnetic circuits are formed by the permanent magnets 30 and the yokes 31.

A laser beam 33 is emitted from an optical system 32, passed through a light transparent portion 34 formed at the slide portion 26 and the slide shaft 27, reflected at a mirror 35 disposed in the slide portion 27 and fixed onto the carriage 21, directed to the objective lens 25 and focused and irradiated onto the optical disc. Light reflected from the disc follows the same path in the opposite direction to be incident onto the optical system 32.

In the same way as the case described above, when the focus error signal is supplied to the coils 29, since the coils 29 are disposed within the magnetic field between the magnets 30 and the yokes 31, an electromagnetic force is generated with the result that the armature 24, with the objective lens 25, is moved in the vertical or focusing direction. At this time, the slide portion 26 is guided by the slide shaft 27 so that the armature 24 smoothly moves in the vertical direction. The height of the coils 28 are selected to be sufficiently higher than that of the yoke 31, so as to permit the vertical movement of the armature 24 required for focusing.

The coils 28 are driven in response to the tracking error signal and the carriage error signal. Since the coils 28 are also disposed within the same magnetic field generated by the permanent magnets 30, an electromagnetic force is generated so that the armature 24, with the objective lens 25 and carriage 21, moves along the guide shafts 23, and hence in the tracking and carriage-servo direction.

Since the optical system 32 in the apparatus of FIG. 3 is not loaded on the carriage 21 the entire carriage 21 can be made to weigh about 10 g. As a result, the average access time can be shortened to about 70 ms.

However, in the apparatus of FIG. 3, since the carriage 21 is moved not only for carriage control, which is a rough access conducted for the seek operation, but also for tracking control, which is a fine access on the order of microns, the load imposed during tracking is greater than in the apparatus of FIG. 2. Further, the friction on the slide portion 22 when it is moved produces a hysteresis phenomenon. Moreover, the mass distribution of the carriage 21 can cause an imbalance in the driving force of the coils 28, and the frequency characteristic changes depending on the amount of its movement. Consequently, with specific reference to the frequency characteristic, gain can suddenly be changed or the phase can be disturbed in the high range of bandwidth, thus making it difficult to achieve a precise tracking servo action.

SUMMARY OF THE INVENTION

The present invention was made in view of the foregoing circumstances, and its first object is to eliminate the above-described drawbacks.

A second object of the invention is to achieve a faster access.

A third object of the invention is to enable a precise tracking control.

The optical head apparatus according to the invention is for recording or reproducing information onto or from an optical disc, and comprises:

a guide member extending in a direction parallel with the radial direction of the optical disc;

a carriage movable along the guide member;

an armature mounted on the carriage so that it can rotate about the pivotal axis perpendicular to the surface of the optical disc;

an objective lens fixed to the armature at a distance from the axis and positioned to traverse the tracks on the optical disc when the armature rotates;

said objective lens moving in a substantially radial direction of the disc when the carriage moves along said guide member;

a pair of guide yokes fixed relative to the guide member and extending in parallel with the member; and a pair of tracking and carriage-servo coils wound to surround the guide yokes and not to be fixed to the guide yokes, and having a hollow through which the guide yokes loosely extend;

the tracking and carriage servo coils being fixed to the armature;

a magnetic field means for creating magnetic lines of force perpendicular to the guide yokes and parallel with the surface of the optical disc so that the coils an electromagnetic force in the direction parallel with the guide yokes is created when a current is made to flow through the coils; and a drive circuit for supplying currents to the tracking and carriage-servo coils in such directions as to apply, to the tracking and carriage-servo coils, electromagnetic forces in parallel with each other thereby to drive the armature along the guide yokes or in such directions as to apply, to the tracking and carriage-servo coils, electromagnetic forces in antiparallel with each other to rotate the armature about the pivotal axis.

PREFERRED EMBODIMENT OF THE INVENTION

Figure 1:
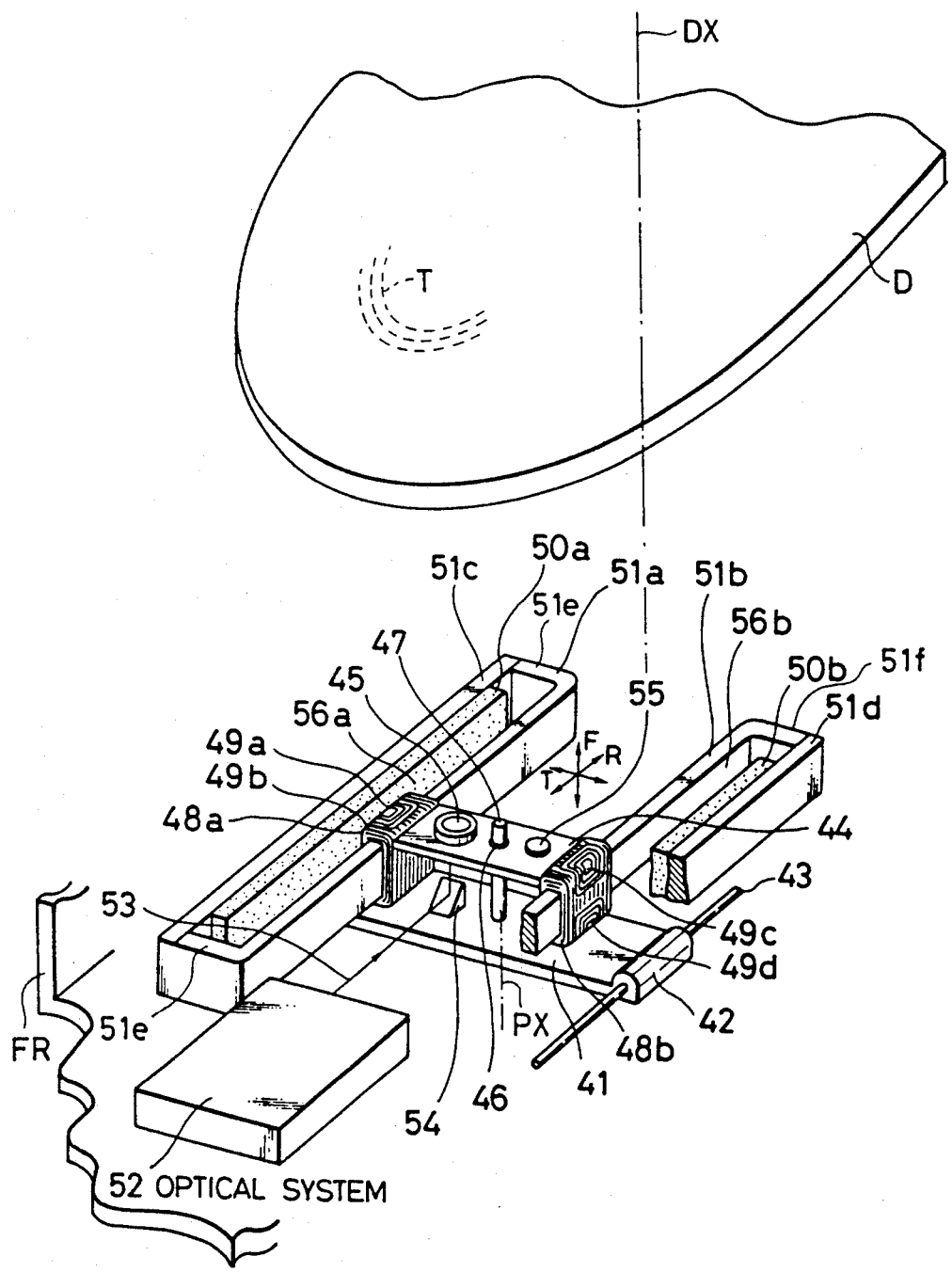
FIG. 1 is a perspective view of an optical head apparatus according to the present invention.

FIG. 1 illustrates an arrangement of the optical head apparatus according to the invention.

The optical head apparatus of this embodiment is for recording or reproducing information onto or from an optical disc D, along tracks T in circles or in a spiral form.

The optical disc D is supported by a fixed structure or a frame, schematically indicated by FR, of the optical head apparatus so that it can rotate about an axis DX perpendicular to the surface of the optical disc D.

A pair of guide shafts 43 are fixed to the frame FR and extend in a direction parallel with the radial direction of the optical disc D.

A carriage 41 is supported by the guide shafts 43 so that it is movable along the guide shafts 43. More specifically, the carriage 41 has a pair of slide portions 42 formed on opposite ends of the carriage 42 and the guide shafts 43 extend through respective holes in the slide portions 42, as is better illustrated in FIG. 1A.

An armature 44 is mounted on the carriage so that it can rotate about a pivotal axis PX perpendicular to the surface of the optical disc D. The armature is supported so that it is also movable in the focusing direction, i.e., the direction perpendicular to the surface of the optical disc relative to the carriage.

In the illustrated example, a post 47 is fixed upright to the carriage 41 and extending toward and perpendicular to the surface of the optical disc D.

The armature 44 is engaged with the post 47 via a bearing 46 provided at substantially the center of the armature 44. The armature 44 is therefore not only rotatable about the post 47, as shown by arrow R, but also movable in the focusing direction, i.e., the longitudinal direction of the post 47, as shown by arrow F.

An objective lens 45 is fixed to the armature 44 at a distance from the axis and positioned sideways with respect to the longitudinal direction of the guide shafts 43 and hence to the radial direction of the disc D, so as to traverse the tracks T on the optical disc D when the armature 44 rotates.

Figure 9:
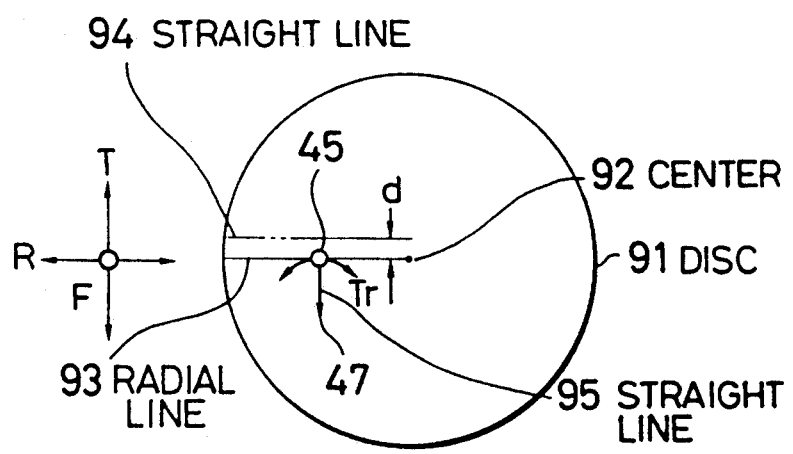
FIG. 9 is an explanatory view of the carriage and the tracking servo action.

As shown in FIG. 9, the objective lens 45 is so positioned that as the carriage 41 moves along the guide shafts 43, the objective lens 45 moves on a radial line 93 passing the axis DX of the disc D or on a straight line 94 parallel with the radial line 93 and spaced apart from the radial line 93 by a relatively small distance d. What is essential is that the tracks T on the disc D are traversed by the light beam from the objective lens 45 as the carriage 41 moves along the guide shafts 43. The term "substantially radial direction" as used in the appended claims should therefore be construed to encompass a direction along a straight line spaced by a small distance from the radial line, and hence a situation in which the tracks T are traversed by the light beam.

A counterbalancing weight 55 having substantially the same weight as the objective lens 45 is attached onto the armature 44, and is spaced apart from the post 47 by the same distance and on the opposite side of the objective lens 45 with respect to the post 47 to achieve a balance with the objective lens 45. As a result, an adverse effect due to an imbalance in weight can be avoided.

A pair of guide yokes 51a and 51b are fixed to the frame FR and hence fixed relative to the guide shafts and extending in parallel with the guide shafts. In the illustrated example, the guide yokes 51a and 51b have a rectangular cross section having a height h and a width w.

Figure 1A:
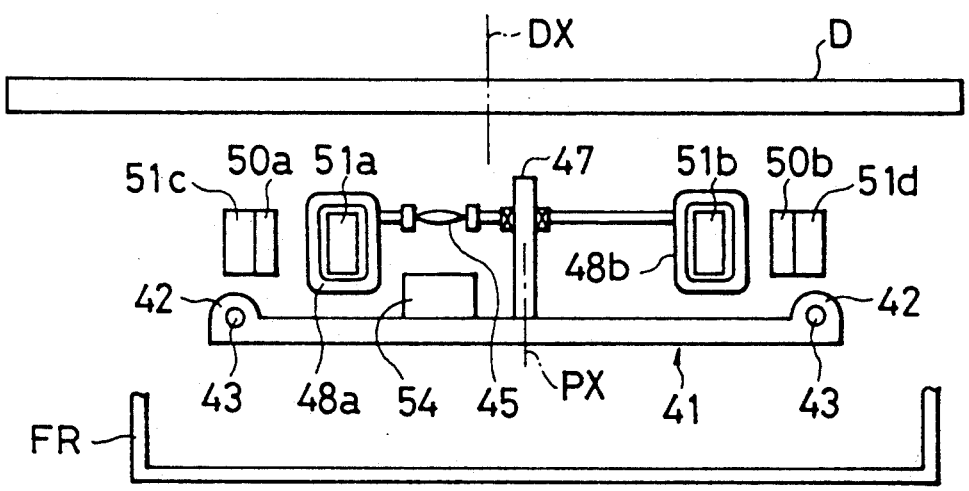
FIG. 1A is an elevational view of the optical head apparatus.
Figure 2:
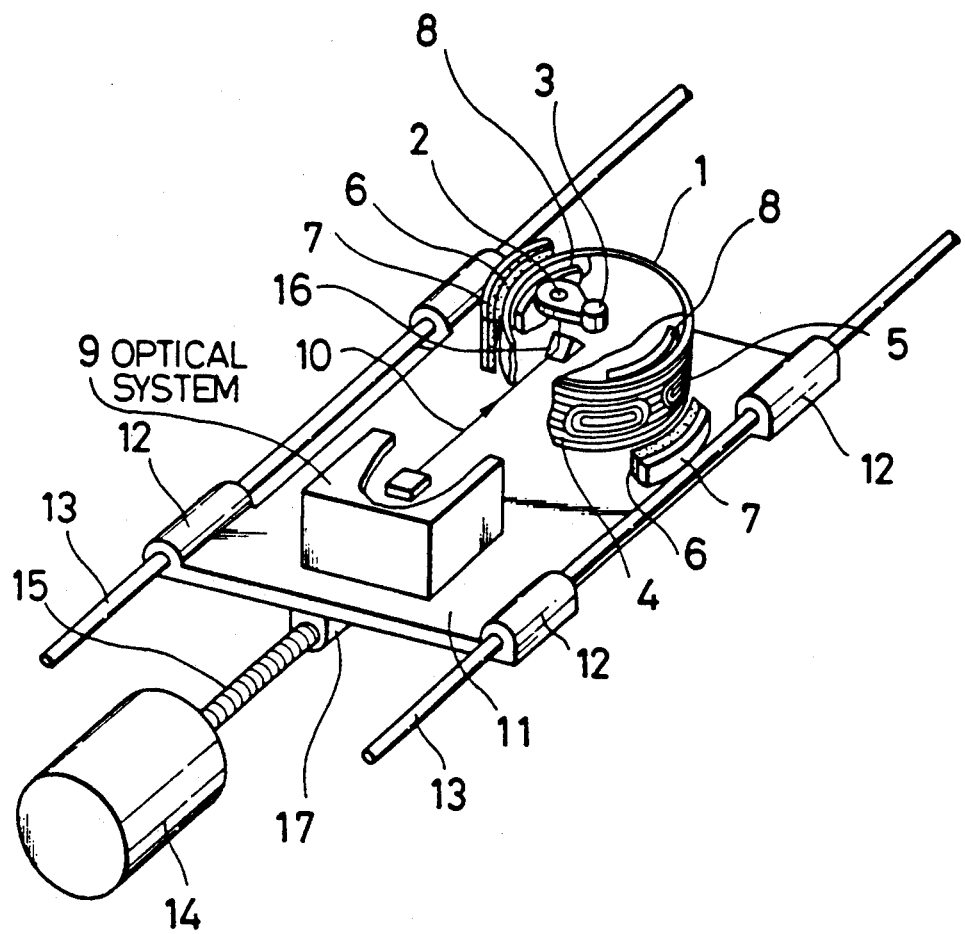
FIG. 2 is a perspective view of a first example of a conventional optical head apparatus.
Figure 3:
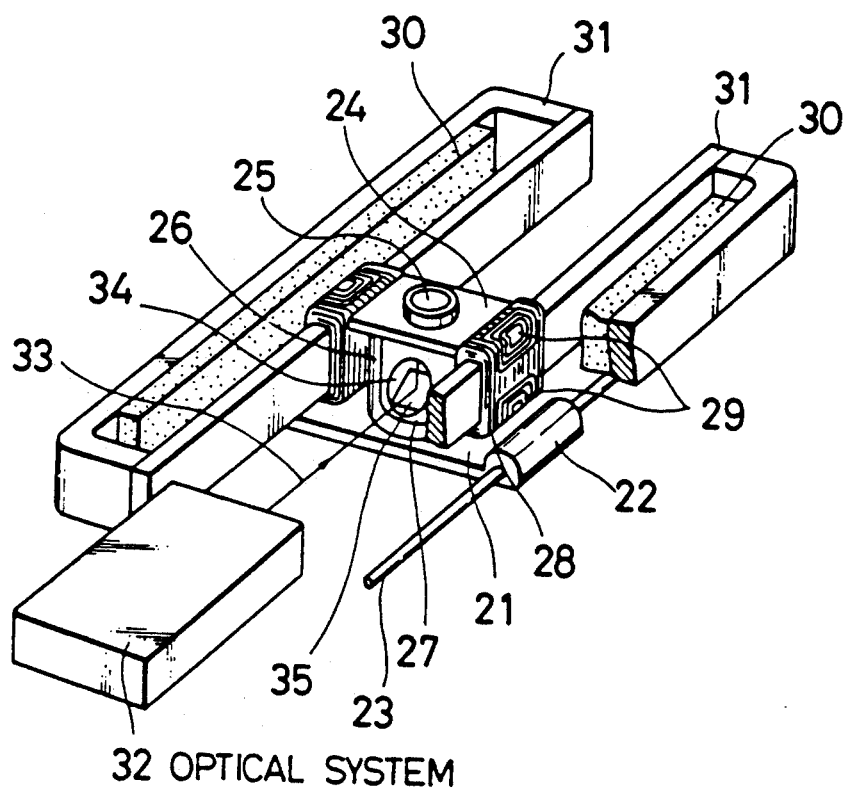
FIG. 3 is a perspective view of a second example of a conventional optical head apparatus.

A pair of tracking and carriage-servo coils 48a and 48b are fixed to the armature 44, on its ends (left and right ends as seen in FIG. 1A) opposite to each other with respect to the post 47, and are each wound so that the entire coil forms a square column having a rectangular hollow space inside it, surrounding but not fixed to the guide yokes 51a and 51b.

Figure 4:
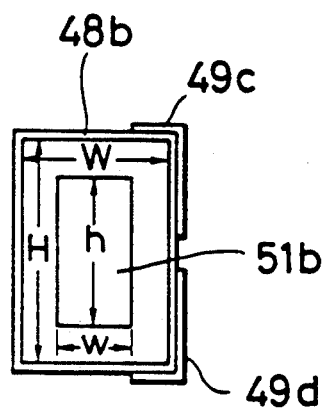
FIG. 4 is a cross-sectional view of a coil according to the present invention.

In the illustrated example, each of the tracking and carriage-servo coils 48a and 48b has a rectangular cross section with its central hollow also having a rectangular cross section. As shown in FIG. 4, the dimension of the hollow of the tracking and carriage-servo coils 48a and 48b in the direction perpendicular to the longitudinal direction of the guide yokes 51a and 51b and parallel with the surface of the optical disc D, i.e., the width W of the hollow, is larger than the corresponding dimension, i.e., the width w, of the guide yokes 51a and 51b, so as to permit rotation of the armature 44 about the post 47. The dimension of the hollow of the tracking and carriage-servo coils 48a and 48b in the direction perpendicular to the longitudinal direction of the guide yokes 51a and 51b and perpendicular to the surface of the optical disc D, i.e., the height H of the hollow, is larger than the corresponding dimension, i.e., the height h, of the guide yokes 51a and 51b so as to permit movement of the armature 44 in the focusing direction.

Figure 8:
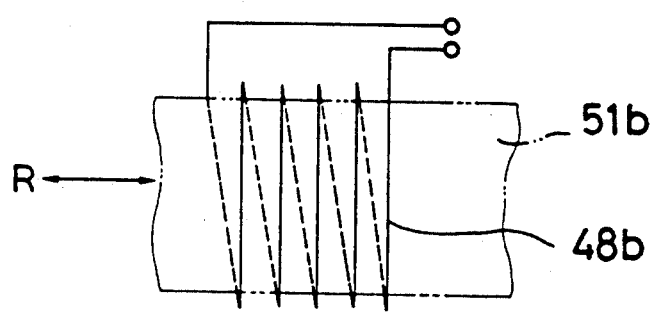
FIG. 8 is an explanatory view of a carriage and tracking coil according to the present invention.

As shown in FIG. 8, the coils 48 and 49b have portions extending in the direction perpendicular to the surface of the disc D.

Figure 7:
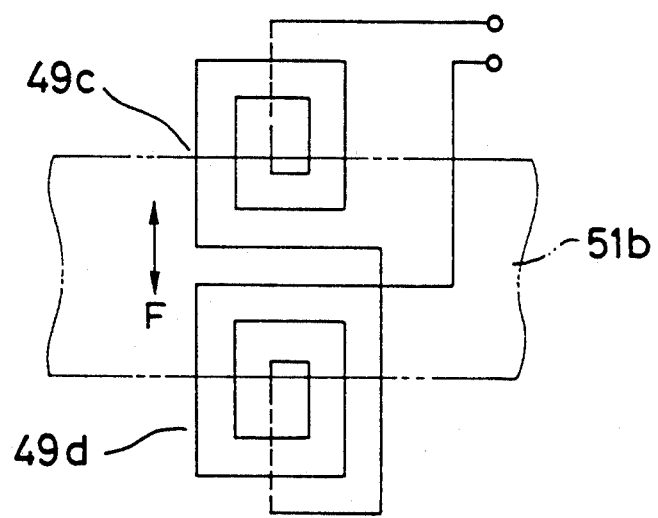
FIG. 7 is an explanatory view of a focusing coil according to the present invention.

The focusing coils 49a and 49b are stuck to the upper and lower corners on the outer surface of the tracking and carriage-servo coils 48a. The focusing coils 49c and 49d are stuck to the upper and lower corners on the outer surface of the tracking and carriage-servo coils 48b. The focusing coils 49a to 49d are flat and substantially rectangular are wound in spiral form, and have portions extending in the longitudinal direction of the guide yokes 51a and 51b, as shown in FIG. 7.

Magnetic field members, such as permanent magnets 50a and 50b, are provided to create magnetic lines of force perpendicular to the guide yokes 51a and 51b, and in parallel with the surface of the optical disc D. As a result, an electromagnetic force is created in the direction parallel with the guide yokes when a current is made to flow through the tracking and carriage-servo coils 48a and 48b, and an electromagnetic force is created in the focusing direction when a current is made to flow through the focusing coils 49a and 49d.

The permanent magnets 50a and 50b are rod-shaped and have a rectangular cross section. Each of the permanent magnets 50a and 50b, extends in parallel with a respective one of the guide yokes 51a and 51b, and is magnetized in the direction perpendicular to the longitudinal direction of the guide yokes 51a and 51b, and in parallel with the surface of the optical disc D. The pole faces of the permanent magnets 50a and 50b confront the coils surrounding the guide yokes 51a and 51b, and gaps 56a and 56b are formed between the pole faces of the permanent magnets 50a and 50b and the confronting surfaces of the coils.

Support yokes 51c and 51d are provided to extend in parallel with the guide yokes 51a and 51b and have a rectangular cross section having a side surface normal to the direction of the magnetization of the permanent magnets 50a and 50b. The permanent magnets 50a and 50b are fixed to the above-mentioned side surfaces of the support yokes 51c and 51d. The support yokes 51c and 51d are connected at both ends, with bent ends 51e and 51f of the guide yokes 51a and 51b. Thus, the guide yokes 51a and 51b with the bent ends 51e and 51f, the support yokes 51c and 51d, the permanent magnets 50a and 50b, and the gaps 56a and 56b respectively form closed magnetic circuits, through which magnetic flux from the permanent magnets 50a and 50b pass.

Figure 5:
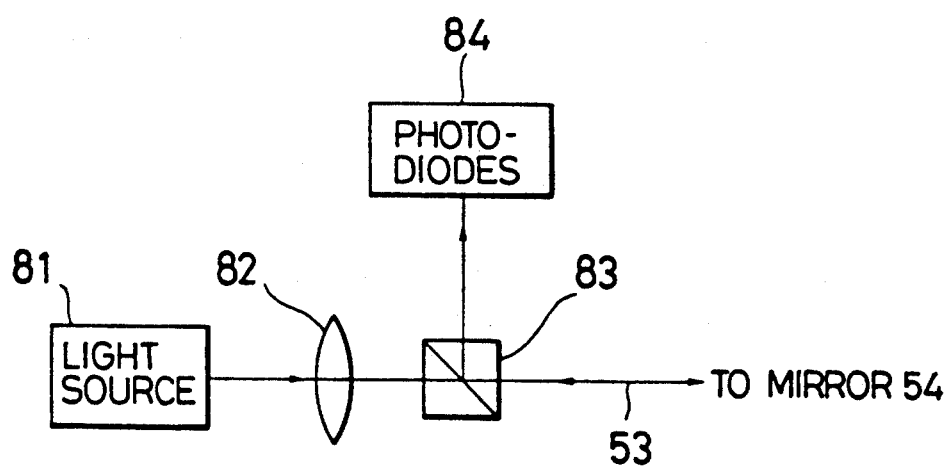
FIG. 5 is a plan view of an optical system according to the present invention.

An optical system 52, which is fixed to the frame FR and hence fixed relative to the guide shafts 43, generating a light beam parallel with the guide yokes 51a and 51b. As is schematically shown in FIG. 5, the optical system includes a light source 81 comprised of a semiconductor laser or the like, a collimate lens 82 converting light from the light source 81 into a parallel beam, a beam splitter 83, and a photodetector element, such as photodiodes 84. By the function of the light source 81 and the collimate lens 82, the optical system emits a light beam 53 traveling in the direction parallel with the guide yokes 51a and 51b.

A mirror 54 is mounted on the carriage 41 and receives the light beam 53 from the optical system 52, and reflects it through 90° and directs the reflected light toward the objective lens 45. The mirror also receives light from the optical disc D via the objective lens 45 and reflects it toward the optical system 52.

The beam splitter 83 separates the light traveling back from the mirror 54, from the light emitted from the light source 81.

Figure 6:
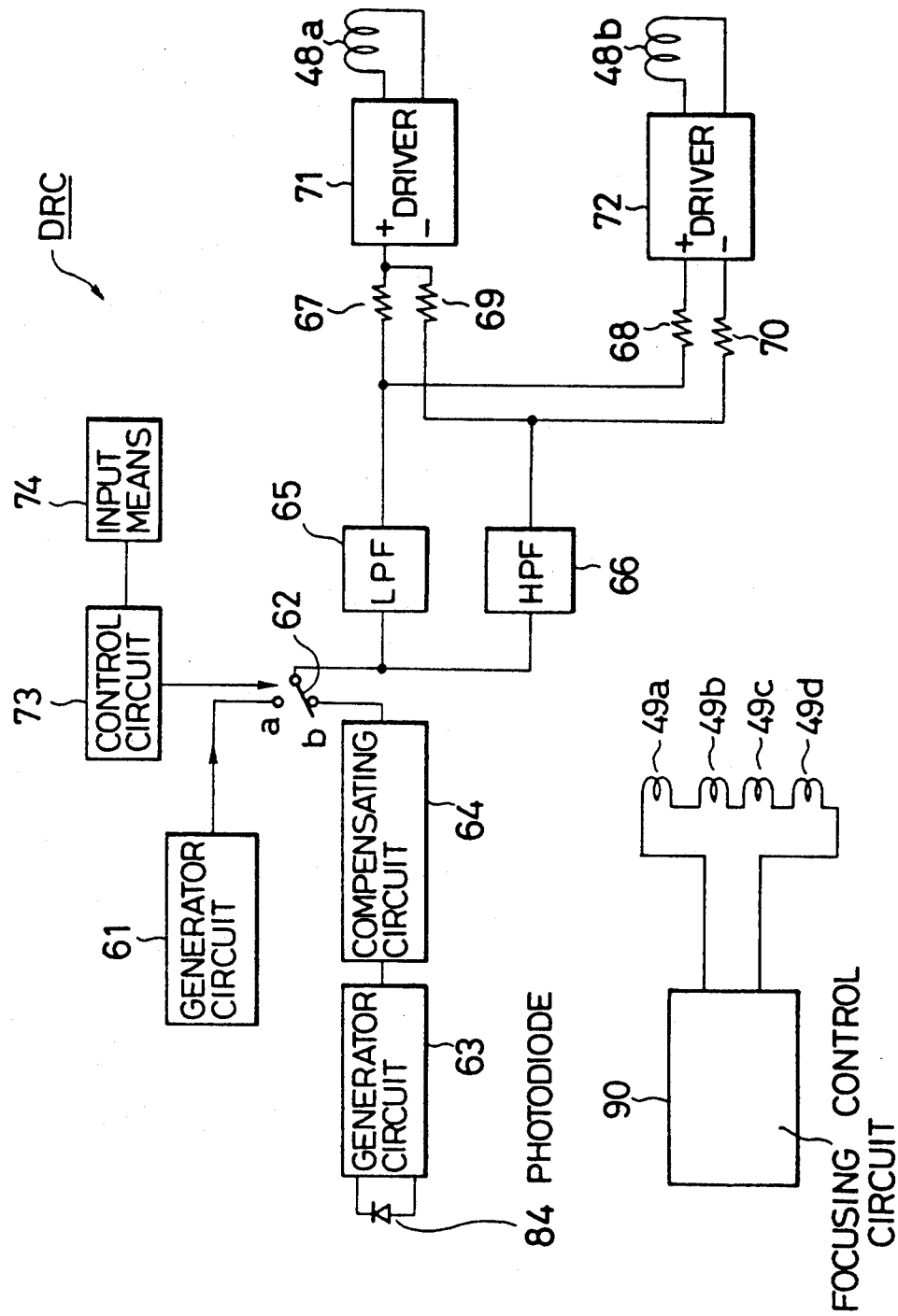
FIG. 6 is a block diagram of a driving circuit according to the present invention.

A drive circuit DRC, shown in FIG. 6, is provided for supplying electric currents to the tracking and carriage-servo coils 48a and 48b in such directions as to apply, to the tracking and carriage-servo coils 48a and 48b, electromagnetic forces in parallel with (in the same direction with) each other thereby to drive the armature 44 along the guide yokes 51a and 51b, or in such directions as to apply, to the tracking and carriage-servo coils 48a and 48b, electromagnetic forces in antiparallel with (in opposite direction to) each other to rotate the armature 44 about the post 47.

The drive circuit DRC comprises a signal generator 61 for generating a carriage error signal. The signal generator 61 may include a counter for counting the number of tracks traversed by the light beam. The dirve circuit DRC also comprises a signal generator 63 for generating a tracking error signal of the basis of the outputs of the photodiodes 84.

A compensating circuit 64 compensates the tracking error signal output by the signal generator 63 to have a predetermined frequency characteristic.

A means 62 merges merging the carriage error signal and the tracking error signal via the compensating circuit 64. In the illustrated embodiment, the merging means 62 is in the form of a switch for selecting either the carriage error signal or the tracking error signal.

A low-pass filter 65 and a high-pass filter 66 respectively separate the low-frequency and high-frequency components from the outputs of the switch 62.

The outputs of the low-pass filter 65 and the high-pass filter 66 are supplied via resistors 67 and 69 to a non-inverted input terminal of a first driver 71, which supplies the tracking and carriage-servo coil 48a with a first current proportional to or otherwise in accordance with the sum of the outputs of the low-pass filter 65 and the high-pass filter 66. The outputs of the low-pass filter 65 and the high-pass filter 66 are also supplied via resistors 68 and 70 to a non-inverted input terminal and an inverted input terminal of a second driver 72, which supplies the tracking and carriage-servo coil 48b with a second current proportional to or otherwise in accordance with the difference between the outputs of the low-pass filter 65 and the high-pass filter 66.

The driver 71 may comprise an operational amplifier, and forms, together with the resistors 67 and 69, a first drive means which supplies the tracking and carriage-servo coil 48a with a current determined on the basis of the sum of the outputs of the low-pass filter 65 and the high-pass filter 66. Similarly, the driver 72 may comprise an operational amplifier, and forms, together with the resistors 68 and 70, a second drive means which supplies the tracking and carriage-servo coil 48b with a current determined on the basis of the difference between the outputs of the low-pass filter 65 and the high-pass filter 66.

The direction of the currents supplied by the first and second drivers 71 and 72 are such that when the output of the high-pass filter 66 is zero and the output of the low-pass filter 65 has a finite magnitude the electromagnetic forces created by the tracking and carriage-servo coils 48a and 48b are in parallel with each other.

This can be achieved by having the coils 48a and 48b wound in the same phase, having the outputs of the low-pass filter 65 supplied to the driver 71 and 72 in the same phase, having the outputs of the low-pass filter 65 and the high-pass filter 66 supplied to the driver 71 in the same phase, and having the outputs of the low-pass filter 65 and the high-pass filter 66 supplied in opposite phases to the driver 72.

An input means 74 comprises, for example, a switch, key or the like and is operated when a predetermined instruction is input to a control circuit 73 which comprises a microcomputer or the like.

The drive circuit DRC also includes a focusing control circuit 90 which supplies currents to the focusing coil 49a to 49d responsive to a focusing error thereby moving the armature 44 in the focusing direction.

The laser beam 53 emitted from the light source 81 is transformed from diverging light into parallel light by the collimate lens 82. This parallel light passes through the beam splitter 83 to be directed to the mirror 54, which in turn reflects the laser beam 53 incident thereto in the direction substantially parallel to the disc, into the direction substantially perpendicular to the disc to direct it into the objective lens 45, which converges the incident parallel light onto the disc for irradiation. Since the light beam from the collimate lens 82 up the the objective lens 45 is a parallel beam, even if the length of the optical path from the light source 81 up to the objective lens 45 is changed according to the position of the carriage 41, the laser beam can be converged on the disc without being affected by it.

The laser beam reflected by the disc is directed to the beam splitter 83 via the objective lens 45 and the mirror 54. The beam splitter 83 reflects this returned light to be directed to the photodiodes 84.

If the intensity of the laser beam emitted from the light source 81 is made relatively large and is modulated in accordance with the signal, it is possible to change the optical property of the surface of the disc on which the siganl is recorded. Besides, if the intensity is made constant and relatively weak to such an extent that the optical property of the signal recording surface is not changed, the returned light is modulated by the recording signal, and the reproducing signal can be obtained from the outputs of the photodiodes 84.

In addition, if a means for applying astigmatism to the light source, such as a cylindrical lens is disposed along the light path and the photodiodes 84 are divided into four parts (so-called astigmatic method), then the focus error signal can be generated.

Furthermore, the generator circuit 63 computes the difference between the outputs of the photodiodes 84 divided into two parts laterally with respect to the track and generates the tracking error signal by means of, for example a push-pull action.

The focus error signal is supplied to the coils 49a to 49d. The coils 49c and 49d (also 49a and 49b), as shown in FIG. 7, for example, are connected in such a way that the currents flowing through portions extending in the radial direction of the disc (portions extending in the left to right directions in the figure) are directed in the same direction over the range confronting the air gap (magnetic gap) 56b (56a) defined between the magnet 50b (50a) and the guide yoke 51b (51a). Consequently, if the focus error signals of the same phase are supplied to the coils 49a and 49b through 49c and 49d, the electromagnetic force is generated with the result that, guided by the post 47, the armature 44 is driven in the focusing direction F.

Since the height H of the coils 48a and 48b are set sufficiently large as compared with the height h of the guide yokes 51a and 51b, the movement required for the focusing is permitted.

If an input means 74 is manipulated to input an instruction to search for a predetermined track, then a control circuit 73 turns a switch 62 to the side of contact a. At this time, the generator circuit 61 generates and produces a carriage drive signal corresponding to the difference between present track and the target track. Since this signal (usually a d.c. voltage of a predetermined level) has a relatively low frequency, most of it passes through the low-pass filter 65. The signal which has passed through the low-pass filter 65 is supplied to the non-inverted input terminals of the drivers 71 and 72 via resistors 67 and 68. Consequently, the currents of the same phase flows through coils 48 and 48b. As shown in FIG. 8, since the coils 48 and 48b are wound vertically with respect to the longitudinal direction of the guide yokes 51a and 51b, the electromagnetic force is generated in the longitudinal direction of the guide yokes 51a and 51b. Consequently, guided by the guide shafts 43, the carriage 41 is moved in the longitudinal direction of the guide yokes 51a and 51b, and the objective lens 45 is moved in a substantially radial direction.

When the present track coincides with the target track or approaches it, the control circuit 73 turns the switch 62 to the side of the contact b. As a result, after the tracking error signal output by the generator circuit 63 is compensated to a predetermined frequency characteristic by the compensating circuit 64, it is input into the low-pass filter 65 and the high-pass filter 66 via the switch 62.

The high frequency component of the tracking error signal passes through the high-pass filter 66. This signal is input into the non-inverted input terminal of the driver 71 via the resistor 69 while being input into the inverted input terminal of the driver 72 via the resistor 70. Consequently, the coils 48a and 48b are driven with opposite phases by the drivers 71 and 72. That is, in FIG. 1, when the coil 48a generates, for example, the driving force in the rightward (leftward) direction, the coil 48b generates the driving force in the leftward (rightward) direction. As a result, the armature 44 is rotated in the clockwise or counterclockwise direction with the post 47 as a fulcrum. As shown in FIG. 9, since a straight line 95 connecting the post 47 with the center of the objective lens 45 at the rest position, or the position at the center of the range of rotation of the armature is made to run substantially vertical to the radius 93 (substantially parallel to the direction T of the track), the objective lens 45 is rotated in the tracking direction Tr. This direction runs substantially parallel to the radial direction R of the disc in the range in which the rotation angle does not become so large.

At this time, since the width W of the coils 48a and 48b is set sufficiently larger than the width w of the guide yokes 51a and 51b, the rotation of the armature 44 for tracking is permitted.

On the other hand, the low band component of the tracking error signal is separated (by integration) by the low-pass filter 65 and is supplied as the carriage error signal to the drivers 71 and 72 with the same phase via the resistors 67 and 68. Consequently, as in the above-described case, the carriage 41 is driven is driven is the direction of radius R by the coils 48a and 48b. As a result, the light spot on the disc continuously keeps tracking the track from the inner circumference toward the outer circumference or in the opposite direction.

Since the mass of the movable portions including the carriage 41 which move in the radial direction of the disc can be made to weigh about 10 g, it is possible to achieve a frequency characteristic which is flat up to about 1 KHz. Besides, since the mass of the movable portions which move in the tracking direction can be made to weigh about 1 g, it is possible to achieve a frequency characteristic which is flat from 300 Hz to 6 KHz. Consequently, the cut-off frequency of the low-pass filter 65 and the high-pass filter 66 can be, for example, about 600 Hz. Incidentally, when the coils 48a and 48b are wound with opposite phases (opposite directions), the tracking error signal and the carriage error signal may respectively be supplied in the same phase and in opposite phases.

As described above, in the present invention, the armature provided with the objective lens is supported on the carriage so that it may slide in the focusing direction and may rotate in the tracking direction. In addition, the armature is driven by the carriage error signal with the same phase and the tracking error signal with the opposite phases. Consequently, it is possible to lighten the movable portions to that a prompt access and a precise tracking control can be achieved.

What is claimed is:

1. Optical head apparatus for recording or reproducing information onto or from tracks of an optical disc, comprising:

a guide member extending in a direction parallel with a radial direction of the optical disc;
   a carriage movable along said guide member;
   an armature mounted on said carriage, said armature being rotatable about a pivotal axis perpendicular to a surface of said optical disc;
   an objective lens fixed to said armature at a distance from said axis and positioned to traverse the tracks on said optical disc when said armature rotates, said objective lens moving in a substantially radial direction of the disc when the carriage moves along said guide member;
   a pair of guide yokes fixed relative to said guide member and extending in parallel with the member; and
   a pair of tracking and carriage-servo coils surrounding said guide yokes and not fixed thereto said tracking and carriage-servo coils being fixed to said armature and having a hollow interior through which said guide yokes loosely extend;
   a magnetic field means for creating magnetic lines of force perpendicular to the guide yokes and parallel with the surface of said optical disc, an electromagnetic force being created in the direction parallel with the guide yokes when a current flows through said coils; and
   a drive circuit for supplying currents to said tracking and carriage-servo coils in such directions as to apply, to said tracking and carriage-servo coils, electromagnetic forces in parallel with each other thereby driving the armature along said guide yokes or in such directions as to apply, to said tracking and carriage-servo coils, electromagnetic forces in antiparallel with each other thereby rotating the armature about said pivotal axis.

2. The apparatus of claim 1, wherein said guide member comprises a pair of guide shafts extending in parallel with each other, said carriage having slide portions slidably supported by said guide shafts.

3. The apparatus of claim 1, wherein the dimension of the hollow of said tracking and carriage-servo coils in the direction perpendicular to the longitudinal direction of the guide yokes and parallel with the surface of the optical disc is larger than the corresponding outer dimension of the guide yokes to permit rotation of the armature for tracking.

4. The apparatus of claim 1, wherein
   said armature is supported so that it is movable in the direction perpendicular to the surface of the optical disc relative to the carriage; and wherein
   said apparatus further comprises focusing coils attached to said tracking and carriage-servo coils having portions extending in the longitudinal direction of said guide yokes, an electromagnetic force being thereby created in a focusing direction when a current flows through said focusing coils; and wherein
   said drive circuit also supplies currents to said focusing coils responsive to a focusing error thereby moving the armature in the direction perpendicular to the surface of the optical disc.

5. The apparatus of claim 4, wherein the dimension of said hollow of said tracking and carriage-servo coils in the direction perpendicular to the longitudinal direction of the guide yokes and perpendicular to the surface of the optical disc is larger than the corresponding outer dimension of the guide yokes to permit movement for focusing.

6. The apparatus as set forth in claim 1, wherein said magnetic field applying means comprises elongated permanent magnets extending in parallel with the respective guide yokes, each permanent magnet being magnetized in the direction perpendicular to the longitudinal direction of the guide yokes and parallel with the surface of the optical disc.

7. The apparatus of claim 1, wherein a counterbalancing weight is attached to said armature at the side opposite said objective lens with respect to said pivotal axis to achieve a balance with said objective lens.

8. The apparatus of claim 1, wherein said armature has opposite ends and the tracking and carriage servo coils are fixed thereto.

9. The apparatus of claim 1, further comprising an optical system including
 a light source fixed relative to the guide member, said light source generating a light beam parallel to the guide yokes; and
 a mirror mounted on the carriage, said mirror reflecting said light beam through substantially 90° toward the objective lens.

10. The apparatus of claim 9, wherein said optical system further comprises
 a photodetector element for receiving light reflected from said optical disc; and
 a beam splitter, said beam splitter separating light from the optical disc from the light emitted by said light source.

11. The apparatus of claim 10, wherein said optical system further comprises a collimate lens converting light from the light source into a parallel beam.

12. The apparatus of claim 1, wherein said drive circuit comprises:
 a signal generating means for generating a carriage error signal and a tracking error signal;
 a merging means for merging the carriage error signal or the tracking error signal;
 a low-pass filter and a high-pass filter receiving the output of the merging means;
 a first driver supplying a first current to a first one of the tracking and carriage-servo coils, said first current being determined by the sum of the outputs of the low-pass filter and the high-pass filter;
 a second driver supplying a second current to a second one of the tracking and carriage-servo coils, said second current being determined by the difference between the outputs of the low-pass filter and the high-pass filter, the direction of the currents supplied by said first and second drivers being such that when the output of the high-pass filter is zero and the output of the low-pass filter has a finite magnitude the electromagnetic forces created by said tracking and carriage-servo coils are in parallel with each other.

13. The apparatus of claim 12, wherein said merging means comprises a switch for selecting either the carriage error signal or the tracking error signal.

14. The apparatus of claim 13, wherein said first and second drivers comprise an operational amplifier.

* * * * *